United States Patent [19]

Debat

[11] 3,856,946
[45] Dec. 24, 1974

[54] PRUNUS AFRICANA EXTRACT
[75] Inventor: Jacques Debat, Paris, France
[73] Assignee: Laboratoires du Dr. Debat, Paris, France
[22] Filed: Mar. 8, 1973
[21] Appl. No.: 339,205

Related U.S. Application Data
[63] Continuation of Ser. No. 66,631, Aug. 24, 1970, abandoned, which is a continuation-in-part of Ser. No. 643,347, June 5, 1967, abandoned.

[30] Foreign Application Priority Data
June 10, 1966  Great Britain............... 25893/66

[52] U.S. Cl. ............................................. 424/195
[51] Int. Cl............................................... A61k 27/00
[58] Field of Search ................................... 424/195

[56] References Cited
UNITED STATES PATENTS
2,464,240  3/1949  Krebs et al......................... 424/195

FOREIGN PATENTS OR APPLICATIONS
1,177,645  1/1970  Great Britain

OTHER PUBLICATIONS
Steinmetz, "Codex Vegetabilis," items 905–17, Amsterdam, 1957.
Chem. Abst., Vol. 58, 3042d, 1963.
Chem. Abst., Vol. 59, 8543f, 1963.
Chem. Abst., Vol. 60, 4442h, 1964.

Primary Examiner—Stanley J. Friedman
Attorney, Agent, or Firm—Bacon & Thomas

[57]  ABSTRACT

An extract of the plant *Prunus africana* (Hook f.) Kalkm. also known as *Pygeum africanum* (Hook f.) for use in the treatment of prostatic disorders, which contains sterols. This extract is obtained from the bark, wood, flowers or fruit of the plant by extraction with a solvent.

8 Claims, No Drawings

PRUNUS AFRICANA EXTRACT

This application is a continuation of application Ser. No. 66,631, filed Aug. 24, 1970 and now abandoned, which latter application is in turn a continuation-in-part of application Ser. No. 643,347, filed June 5, 1967 and also abandoned.

This invention relates to a medicinal preparation and certain plant extracts and to the use of such extracts for medicinal purposes, particularly in the treatment of glandular disorders. The invention relates also to a process for preparing said extracts and to the intermediate fractions obtained during the process and containing the active ingredients.

According to the invention there is provided a medicinal preparation which includes as the active ingredient a part of an African plant of the rosaceae family, amygdales tribe, genus Prunus, particularly a plant of the species known as *Prunus africana* (Hook f.) Kalkmann also known as *Pygeum africanum* (Hook f.) — see C. Kalkmann "Old World species of Prunus," published in Blumea XIII 1.115 (1965), Hutchinson & Dalz "Flora of Tropical West Africa" (1958) pages 44–47, and "An Atlas of End-Grain Photomicrographs for the Identification of Hardwoods," page 62 (1953 reprinted 1961 by her Majesty's Stationery Office, London) —, and all related species, found particularly in Southern and Eastern Africa. As related species are known for instance *Prunus crassifolia, Prunus lusitanica, Prunus latifolium, Prunus parviflorum, Prunus laurocerasus.*

Preferably, the active ingredient is obtained from the bark of the plant but also the wood, the flowers, the fruits and other parts of the plant can be used to obtain the desired product.

The bark may conveniently be used in dry pulverized form. To this end the bark may be dried in the shade, and then pulverized such as by means of a grinding mill.

The process for preparing the above-cited extracts is characterized in that the extraction of 1 kg of the bark, wood, flowers or fruit of the plant is conducted with at least 2 litres of solvent. To obtain the active ingredient in a purified crystalline form, the intermediate extract thus obtained can be chromatographed on a silica column using cyclohexane, methylene chloride, benzene or mixtures thereof as the eluting agent.

As extraction solvents are used distilled water, methanol, chloroform, methylene chloride, benzene, cyclohexane, petroleum ether, diethyl ether, acetone, methylethylketone, and mixtures thereof.

A final product containing an unidentified mixture of sterols with other constituents is finally obtained as a white powder well crystalline.

The intermediate noncrystalline extracts and the crystalline product can both be used for medicinal purposes.

They can be presented in various pharmaceutical forms, such as tablets, cachets, capsules, dragees, liquid compositions for subcutaneous, intramuscular or intravenous injection, or hypodermic pastilles or pellets.

The following examples are given to illustrate the preparation of the extracts and of a purified product according to the invention:

EXAMPLE 1

100 Gms. of finely ground powder of *Pygeum africanum* bark were extracted three times with 200 cc. volumes of a methanol/water mixture (80 : 20). the extracts were filtered and evaporated under vacuum at 30° C. There was obtained a pasty extract, with a yield of 20% with respect of the weight of bark powder used.

EXAMPLE 2

Using chloroform as the extraction solvent in place of the methanol/water mixture as in Example 1, a yield of 0.5% of pasty extract with respect to the weight of the initial bark powder was obtained.

The conventional reactions of the sterols conducted with chloroformic and methanolic extracts of the powder of the plant obtained in this manner, have shown the presence of sterols in relative abundance.

EXAMPLE 3

A chromatographic column of a diameter of about 5 cm is charged with 350 g of silica for chromatographic separation in pure cyclohexane, for analysis. The sample is prepared in the following manner:

The extract to be separated, obtained in accordance with the examples 1 or 2, is put in solution in a suitable solvent. There is added five times the weight of the sample of silica used for charging the column. The solvent is evaporated under agitation at the bottom of a vessel, and thereafter under vacuum for eliminating the last traces. A powder is obtained, having adsorbed therein the extract to be purified. This powder is dusted on the top of the column, and topped by the exact quantity of cyclohexane required for wetting it. Thereafter, solvents of increasing polarity are passed through the column, for example pure cyclohexane, cyclohexane-benzene (95 : 5), cyclohexane-benzene (50 : 50), pure benzene, methylenechloride-benzene (95 : 5), etc.

A change of solvent is made each time that the fractions collected at the base of the column no longer contain particles in solution. The total sterolic fraction is eluted in conventional manner with a cyclohexane-benzene mixture (50 : 50), but this depends on the activity of the silica.

The highly purified active ingredient isolated in this manner represents about 0.05 % by weight calculated on the dry plant used initially.

The course of the chromatography and the ascertaining of the isolated constituents can take place by two methods:

1. Thin layer chromatography:
   Support: Silicagel G 254 (fluorescent) of a thickness of 0.25 mm
   Activation: 10 minutes at 110° C,
   Solvent: Cyclohexane-ethyl acetate (85 : 15),
   Duration of Development: 1½ hours at 20° C,
   Revealer: 6 N sulphuric acid, giving the sterolic fraction a characteristic violet coloration after rapid passage through the furnace. The Rf at this spot is about 0.28.
2. Gas chromatography:
   For this purpose, use is made of an Aerograph 204 apparatus with ionisation flame detector, comprising a column of stainless steel of a lenghth of 2 feet, a diameter of ⅛ inch, at 5% of the SE 52 on the Aeropak 30 100–120, or in the alternative.
   A column of stainless steel, length 5 feet, diameter ⅛ inch, at 5% of the SE 30 on Chromosorb W 60–80.
   The chromatography is carried out:
   either at constant temperature at 250° C for showing only the sterols, or by programming between 50° to 250° C to show the presence of all constituents.

EXAMPLE 4

This example is provided to compare the efficiency of *Prunus africana* extractions conducted with eight solvents: distilled water, mixture of distilled water and methanol (80 : 20), a mixture of distilled water and methanol (20 : 80), methylene chloride, chloroform, diethyl ether, cyclohexane and benzene.

The plant is treated by lixiviation. 1 kg of finely ground powder of *Prunus africana* bark is charged in a column and traversed at room temperature by the solvent until no extraction is observed.

Distilled water and water-methanol (80 : 20) extracts are lean in sterols and cannot be considered as advantageous although they contain small amounts of the active principle: extraction yields are too poor. These solvents have been eliminated as not being suitable.

Extraction with water-methanol (20 : 80) gives 204 g of a red transparent pasty product which slowly becomes hard in the air, and corresponds to products obtained in example 1. Pharmacological assays performed with this pasty extract have given fair results on rats.

Extraction results with methylene chloride, chloroform, diethyl ether, cyclohexane and benzene are given in table I below.

TABLE I

| Solvents | Total weight of dry extract from a kilo of bark | Weight of dry substance of the sterolic fraction obtained from the preceding extract |
|---|---|---|
| Methylene chloride | 5.9 g | 1.16 g |
| Chloroform | 6.5 g | 1.23 g |
| Diethyl ether | 4.3 g | 1.12 g |
| Cyclohexane | 2.5 g | 0.40 g |
| Benzene | 3.9 g | 0.90 g |

The method of obtaining the sterolic extract from the total extract is as follows:

The total extract is introduced into a flask provided with a cooling agent with 50 ml of 5% alcoholic solution of potash. The contents are taken to reflux for 2 hours. After cooling, the contents are decanted in a decantation vessel and the flask is rinsed with 100 ml water then 100 ml diethyl ether which are themselves decanted in the decantation vessel. The mixture is agitated then decanted. The ethereal phase is collected and the operation is repeated. All of the ether is collected and dried.

A column of 2.5 cm diameter is then charged with silica identical to that described in Example 3, in suspension in pure benzene for analysis. The unsaponifiable product is dissolved. A little benzene is arranged in a ring at the top of the column. An emulsion chromatography is immediately effected with the aid of pure benzene for analysis until the fractions collected no longer give positive reaction. By the Liebermann method, the effluents collected are dried and the residue is weighed. The accuracy of the method may be estimated at 5%.

It is seen that although methylene chloride, chloroform and diethyl ether have given slightly different quantities of total extract, approximately the same amount of sterolic fraction is found, this showing that these solvents are completely suitable both as regards quality and yield, for the obtaining of sterols from the plant.

On the other hand, cyclohexane and benzene, which give at the beginning extracts which are clearly less abundant, also give fewer sterols; they are therefore still suitable for the operation but with a poor yield. The extractions effected on powders of branches, leaves, fruits and the inner bark give similar results.

The activity of the extracts according to the invention is shown in the following pharmacological tests: Pharmacodynamic action: Test A.

Senile rats having a weight of over 300 gms. were used in the tests and a dose of the extract was administered to them. The pasty extract prepared as described in the preceding example was suspended to olive oil to form a suspension containing 20 mg./cc. and this was administered per os. The dose corresponded to 20–100 mg. of the bark powder extract per day per kilo of body weight.

For parenteral administration, physiological saline containing 10% of ethanol as support was used. Injections were effected three times a week, the dose corresponding to 25 mg. of bark powder extract per kg of body weight. The animals were sacrificed at the end of the experiment and immediately subjected to autopsy. The prostate was separated and carefully cleaned; the two testicles were also preserved. The effect of the treatment was judged macroscopically by the general appearance and weight of the organ and microscopically by histological examination of sections.

In the macrological examination, importance was accorded to the color, turgescence and diameter of the gland and particularly to its weight. In order to make the results easier to interpret statistically, the "prostate index" is calculated, this being the quotient of the weight of the prostate in mg. to the weight of the animals in gms. The testicle index, being the quotient of the weight of the two testicles in mg. to the weight of the animal in gms., is also calculated.

In the histological examination, the height of the glandular epithelium of the lobes of the prostate and the mean superficial capacity of the sections of the vessels of the gland were observed. For the testicles, the spermiogenesis was observed.

The following conclusions were noted:

The treated animals underwent a reduction in weight, of 2 to 8%, which did not seem statistically significant, this reduction in weight stopping in the course of the treatment. The weight curve then regained a form similar to that of the controls.

The prostate index of the treated animals was about 20% lower than that of the control. In the treated animals the organ was visibly more slender, a little darker, and clearly softer than in the controls. The examination of the histological sections showed a very clear reduction in the height of the epithelium and a remarkable increase in the secreting activity, approaching that found in much younger animals.

The testicle index was substantially the same in the treated animals and in the controls; the sections indicated a normal spermiogenesis. The action of the extract according to the invention is therefore selective and causes regression of the prostate without affecting the testicles.

The action of the extract increases with its concentration without the effect being proportional, however.

The lipophilic fractions are more active than the hydrophilic fractions.

Toxicity:

No mortality occurred after 5 weeks among groups of rats and mice treated daily with doses 10 times greater than the therapeutic dose, the latter corresponding to about 100 mg. of bark powder extract per kg. of body weight.

Acute Toxicity:

The tests were carried out on rats with the chloroformic extract of example 2. No mortality was observed at a doses of 5 to 8 g/kg of body weight orally, corresponding to more than 4,000 times the foreseen therapeutic dosage.

Chronic Toxicity in Rats:

The experiment was carried out over three months with a chloroformic extract according to the invention, administered to rats.

The rats, 45 males and 45 females, were divided in 3 lots of 30 animals (15 males and 15 females).

1. One control lot received only the excipient being 0.10 ml of olive oil per 100 g of rats.
2. One lot treated received the extract of the invention in a dose of 10 mg per kg (being 1 mg per 100 g in dilution in 0.1 ml of oil).
3. One lot treated received the extract of the invention in a dose of 100 mg per kg (being 10 mg per 100 g in dilution in 0.1 ml of oil).

Observations started and thereafter proceeded with the blood counts of all the animals. The toxicity started eleven days later.

The animals distributed in cages of seven or eight were weighed twice a week and the products were ingested 5 days per week. The blood formulation was examined at regular intervals (table II).

At the end of 3 months, one animal per cage was isolated and put in the presence of males and females for evaluating the possible effect on reproduction.

The following effects were examined:

a. Effect on Growth:

The growth curves of the animals did not evidence a significant difference between the lots. However, with the males, there was found an increase of weight greater with the animals receiving the extract of the invention at a dose of 100 mg/kg. An analysis of the difference in weight, carried out between the three male lots did not show a significant difference (table III).

b. Effect on the blood formula:

No significant difference was found between the control lots and the lots treated. In table II are summarised the mean numerations made before treatment and after 1, 2 and 3 months. The higher rate of white corpuscles, with the controls as well as with the animals treated, seems to be due to the daily ingestion of oil.

c. Effect on reproduction:

The male rats put together with non-treated females and female rats put together with non-treated males, all reproduced normally. The nests are normal. The exterior aspect of the young is in conformity with the control animals. This confirmed, at least for the males, the histological examinations carried out on the testicles in a preceding experiment.

TABLE II

Blood Counts

| 1) — Male Rats: | Controls | | Extract of the Invention | | | |
| --- | --- | --- | --- | --- | --- | --- |
| | | | 10 mg/kg | | 100 mg/kg | |
| | red corpuscles | white corpuscles | red corpuscles | white corpuscles | red corpuscles | white corpuscles |
| Before toxicity | 6,785,000 | 15,136 | 6,659,000 | 15,256 | 6,115,000 | 13,622 |
| 1st Month | 6,164,000 | 25,665 | 6,418,000 | 23,154 | 6,658,000 | 26,523 |
| 2nd Month | 7,343,000 | 36,424 | 8,412,000 | 26,980 | 7,987,253 | 36,753 |
| 3rd Month | 8,272,000 | 43,140 | 9,613,000 | 38,997 | | |

| 2) - Female Rats: | Controls | | Extract of the Invention | | | |
| --- | --- | --- | --- | --- | --- | --- |
| | | | 10 mg/kg | | 100 mg/kg | |
| | red corpuscles | white corpuscles | red corpuscles | white corpuscles | red corpuscles | white corpuscles |
| Before toxicity | 7,039,000 | 13,456 | 7,019,000 | 12,210 | 7,017,000 | 12,245 |
| 1st Month | 6,727,000 | 26,009 | 6,344,000 | 21,266 | 7,027,000 | 18,980 |
| 2nd Month | 6,484,000 | 30,290 | 7,823,000 | 27,966 | 8,277,000 | 24,385 |
| 3rd Month | 6,959,000 | 42,614 | 8,636,000 | 27,958 | | |

TABLE III

RESULTS OF THE ANALYSIS OF THE DIFFERENCE OF THE WEIGHT OF MALE RATS AFTER THREE MONTHS OF TREATMENT

| Origin of fluctuation | Sum of the squares | Degree of freedom | Estimation of the difference | Calculation of F |
| --- | --- | --- | --- | --- |
| between treatments | 18,125 | 2 | 9062 | 9062/3843 = 2.36 |
| Residual | 130,679 | 34 | 3843 | |
| Total | 148,804 | 36 | | |

The value of 2.36 is lower than the value given by the table of F (5%) for F at 2 and 34 degrees of freedom which is equal to 3.28.

Conclusion:

No significant differences were found between the treatments.

The test A described above shows the significant decrease of the weight of the prostate of the rats of one lot treated with bark powder extract, as compared with a non-treated lot.

This test was followed by another test of greater sensitivity, utilising the morphological modification of the prostatic tissue under the influence of the ingestion of wood powder extract and a bark powder extract (Test B).

Several experiments were carried out. The first one of them was carried out in such a way that it permitted verification, apart from the action of the product on the prostate, of its harmlessness as regards the living animal and of its absence of effect on the organs other than the prostate.

With a view towards proving the efficiency of the plant and to give an example of pharmacological testing, the experiment will be described hereunder in detail.

TEST B

The experiment was carried out over 52 days. The animals were male rats of a weight between 256 and 390 g.

Each lot comprised initially 10 animals. The lots were as follows:

control lot;

1 lot treated with a chloroformic bark extract of a dose of 1 mg/kg of animal weight 5 times per week;

1 lot treated with the same extract at a dose of 10 mg/kg of animal weight 5 times per week;

1 lot treated with a methanolic bark extract at a dose of 30 mg/kg, 5 times per week;

1 lot treated with the same extract, at a dose of 300 mg/kg, 5 times per week.

The doses of 1 mg/kg of chloroformic extract and of 30 mg/kg of methanolic extract correspond, according to the yields of extraction, to the therapeutical dose calculated on the basis of 6 g of dry powder per day for a man of 70 kg.

At the end of the experiments, the lot treated with 30 mg/kg of methanol extract included 8 animals and the batch treated with 300 mg/kg included 6 animals: the causes of death were as follows:

in the first case, two animals were killed during the experiments by the other rats:

in the second case, 4 animals died due to an epidemic of rhinopharyngitis. This mortality is therefore not attributable to the product.

An animal of the lot treated with 300 mg/kg methanol extract was separated due to the aberrant weight values that its different organs showed, this phenomenon obviously being due to malformations independent of the treatment. This concerns animal No. 42. The weights of the organs of this animal are shown in the attached tables, but have not been used in the different calculations.

In summary, the five lots, at the end of the experiments, contained: 10, 10, 10, eight and five animals respectively.

Summarising, the five lots, at the end of the experiments, did not show any injury by way of toxicity due to the products of the present invention.

The weight curves show a normal and continuous increase of the weights of the animals. The statistical comparison of the different lots at the end of the treatment shows that there was no significant difference between the controls and the animals treated.

2. Sampling of the Organs:

At the end of the experiments, the animals' heads are cut off. The following organs are removed and weighed; testicles, adrenals, kidneys, seminal vesicles, prostate gland, hypophysis; the ventral lobes of the prostate are weighed separately, giving for this organ two figures for conparison: weight of the ventral lobes and weight of the whole of the prostate. These different organs are then preserved for histological examination. The comparisons between the weights of organs of the different batches are made directly for all the organs removed. In addition, the "prostatic index" and the "testicular index" are calculated (weight of the prostate in mg divided by the weight of the animal in gr. and weight of the testicles in mg divided by the weight of the animal in gr.).

3. Results:

The attached tables IV to VIII show the statistical calculations in detail. These details show that the differences in weight between the organs of the five lots are not significant.

In the case of the prostates, the lot treated with the methanol extract at the rate of 30 mg/kg, shows a significant difference solely for the ventral lobes, this difference not being found in the whole organ. In fact, the efficiency of the extract of the invention is not pointed out by significant differences in the weight of the organ, but by comparison of the sections of prostate of subjects (humans and animals) which have and have not been treated. In these sections, which will be commented on later, a regeneration of the cells and particularly the epithelial cells has been shown.

The histological examination confirms the foregoing fact ascertained, and even permits forming a more precise and exact idea. It was found that the four extracts used showed themselves active in the following decreasing order:

a. Methanolic extract at a dose of 300 mg/kg;
b. Methanolic extract at a dose of 30 mg/kg and Chloroformic extract at a dose of 10 mg/kg;
c. Chloroformic extract at a dose of 1 mg/kg.

The action is expressed in the following manner:

The cells of the prostatic epithelium of the control animals are cylindro-cubic. The epithelial wall is thin. The cells of the treated animals become cylindrical and elongated, secreting papillary formations which penetrate into the inner space. On the other hand, none of the fractions show pathological modifications on the other organs removed.

TABLE IV

INCREASE IN THE WEIGHT OF THE ANIMALS

| Animal No. | Beginning of the experiment | End of the experiment | Increase |
|---|---|---|---|
| Controls: 1 | 358 | 380 | 22 |
| 2 | 300 | 354 | 54 |
| 3 | 348 | 384 | 36 |
| 4 | 330 | 382 | 52 |
| 5 | 338 | 408 | 70 |
| 6 | 350 | 390 | 40 |
| 7 | 322 | 390 | 68 |
| 8 | 372 | 420 | 48 |
| 9 | 320 | 364 | 44 |
| 10 | 328 | 360 | 32 |

| Animal No. | the Beginning of the experiment | End of the experiment | Increase | Animal No. | Beginning of the experiment | End of the experiment | Increase |
|---|---|---|---|---|---|---|---|
| CH Cl$_3$ Extract 1 mg/kg | | | | CH Cl$_3$ Extract 10 mg/kg | | | |
| 11 | 370 | 410 | 40 | 21 | 330 | 420 | 90 |
| 12 | 368 | 390 | 22 | 22 | 272 | 366 | 92 |
| 13 | 372 | 390 | 18 | 23 | 266 | 338 | 72 |
| 14 | 368 | 412 | 44 | 24 | 256 | 310 | 54 |
| 15 | 328 | 348 | 20 | 25 | 326 | 410 | 84 |
| 16 | 352 | 438 | 86 | 26 | 352 | 390 | 38 |
| 17 | 340 | 410 | 70 | 27 | 314 | 330 | 16 |
| 18 | 334 | 440 | 116 | 28 | 330 | 360 | 30 |
| 19 | 280 | 378 | 98 | 29 | 302 | 368 | 66 |
| 20 | 310 | 394 | 84 | 30 | 268 | 288 | 20 |
| Me OH Extract 30 mg/kg | | | | Me OH Extract 300 mg/kg | | | |
| 31 | 350 | 414 | 64 | 41 | 310 | 370 | 60 |
| 32 | 380 | 400 | 20 | 42 | 308 | 308 | 00 |
| 33 | 364 | 394 | 30 | 43 | 332 | 350 | 18 |
| 34 | 318 | 340 | 22 | 45 | 320 | 330 | 10 |
| 36 | 280 | 316 | 36 | 47 | 390 | 434 | 44 |
| 37 | 332 | 352 | 20 | 48 | 342 | 388 | 46 |
| 38 | 360 | 414 | 54 | | | | |
| 39 | 318 | 376 | 58 | | | | |

Table V

WEIGHT OF THE ORGANS (+) only one vesicle was weighed

| Animal No. | weight of the animals (gr) | vesicles (mg) | advenals (mg) | kidneys (mg) | seminal vesicles (mg) | ventral lobes (prostate) (mg) | total prostate (mg) | hypophysis (mg) | testicular index | ventr. lobe index | total prostate index |
|---|---|---|---|---|---|---|---|---|---|---|---|
| Controls | | | | | | | | | | | |
| 1 | 380 | 3517 | 43 | 2824 | 1065 | 332 | 567 | 11 | 9.26 | 0.87 | 1.49 |
| 2 | 354 | 2891 | 41 | 2181 | 1027 | 469 | 604 | 7 | 8.16 | 1.32 | 1.71 |
| 3 | 384 | 3260 | 44 | 2683 | 495(+) | 742 | 884 | 9 | 8.49 | 1.93 | 2.30 |
| 4 | 382 | 3187 | 39 | 2665 | 1136 | 715 | 933 | 11 | 8.35 | 1.87 | 2.44 |
| 5 | 408 | 3511 | 47 | 2562 | 640(+) | 518 | 781 | 11 | 8.60 | 1.27 | 1.91 |
| 6 | 390 | 3205 | 50 | 2926 | 831 | 325 | 464 | 10 | 8.20 | 0.83 | 1.19 |
| 7 | 390 | 2853 | 36 | 3064 | 558(+) | 506 | 685 | 11 | 7.32 | 1.29 | 1.76 |
| 8 | 420 | 3709 | 32 | 2988 | 910 | 413 | 576 | 10 | 8.84 | 0.98 | 1.37 |
| 9 | 364 | 2789 | 37 | 2540 | 1390 | 546 | 575 | 8 | 7.66 | 1.50 | 2.13 |
| 10 | 360 | 3226 | 44 | 2548 | 1253 | 536 | 706 | — | 8.96 | 1.49 | 1.96 |
| CH Cl$_3$ (1 mg/kg) | | | | | | | | | | | |
| 11 | 410 | 3658 | — | 3196 | 806 | 809 | 1005 | 11 | 8.93 | 2.17 | 2.44 |
| 12 | 390 | 2731 | 38 | 2553 | 856 | 500 | 646 | 11 | 7.0 | 1.28 | 1.66 |
| 13 | 390 | 3342 | 50 | 2737 | 1127 | 530 | 702 | 12 | 8.56 | 1.36 | 1.80 |
| 14 | 412 | 3096 | 33 | 2681 | 1258 | 596 | 814 | 11 | 7.50 | 1.45 | 1.98 |
| 15 | 349 | 3017 | 41 | 2160 | 742 | 522 | 673 | 10 | 8.68 | 1.50 | 1.93 |
| 16 | 438 | 3373 | 49 | 2778 | 716(+) | 606 | 885 | 10 | 7.70 | 1.38 | 2.02 |
| 17 | 410 | 3273 | 43 | 2887 | 679 | 340 | 502 | 11 | 7.97 | 0.83 | 1.24 |
| 18 | 440 | 3005 | 36 | 3165 | 1193 | 675 | 878 | 13 | 6.82 | 1.54 | 1.99 |
| 19 | 378 | 3197 | 37 | 2471 | 1719 | 553 | 749 | 10 | 8.46 | 1.46 | 1.98 |
| 20 | 394 | 3402 | 50 | 2535 | 1033 | 324 | 484 | 10 | 8.63 | 0.82 | 1.23 |
| CH Cl$_3$ extract (10 mg/kg) | | | | | | | | | | | |
| 21 | 420 | 2596 | 51 | 2571 | 867 | 241 | 355 | 7 | 6.19 | 0.57 | 0.84 |
| 22 | 364 | 3128 | 37 | 2552 | 1030 | 473 | 623 | 10 | 8.59 | 1.30 | 1.71 |
| 23 | 338 | 3169 | 38 | 2294 | 601 | 628 | 819 | 12 | 9.38 | 1.86 | 2.42 |
| 24 | 310 | 2358 | 23 | 2335 | 409(+) | 384 | 573 | 8 | 7.62 | 1.24 | 1.85 |
| 25 | 410 | 3176 | 53 | 2920 | 768 | 332 | 527 | 14 | 7.76 | 0.86 | 1.28 |
| 26 | 390 | 3515 | 44 | 3108 | 1409 | 555 | 714 | 13 | 9.00 | 1.44 | 1.86 |
| 27 | 330 | 3286 | 41 | 2519 | 583 | 546 | 690 | 10 | 10.00 | 1.65 | 2.09 |
| 28 | 360 | 3151 | 46 | 2347 | 1188 | 563 | 819 | 10 | 8.75 | 1.56 | 2.28 |
| 29 | 368 | 3516 | 34 | 2508 | 1122 | 363 | 591 | 10 | 9.56 | 0.98 | 1.60 |
| 30 | 288 | 2772 | 33 | 2426 | 1162 | 680 | 767 | 9 | 9.60 | 2.08 | 2.66 |

Table V—Continued

WEIGHT OF THE ORGANS (+) only one vesicle was weighed

| Animal No. | weight of the animals (gr) | vesicles (mg) | adrenals (mg) | kidneys (mg) | seminal vesicles (mg) | ventral lobes (prostate) (mg) | total prostate (mg) | hypophysis (mg) | testicular index | ventr. lobe index | total prostate index |
|---|---|---|---|---|---|---|---|---|---|---|---|
| ME OH Extract (30 mg/kg) | | | | | | | | | | | |
| 31 | 414 | 4394 | 50 | 2795 | 1198 | 305 | 486 | 13 | 10.60 | 0.74 | 1.17 |
| 32 | 400 | 3844 | 46 | 2755 | 369 | 493 | 637 | 10 | 9.60 | 1.26 | 1.55 |
| 33 | 394 | 3715 | 55 | 2947 | 386 | 399 | 565 | 9 | 9.45 | 1.01 | 1.43 |
| 34 | 340 | 4031 | 46 | 2333 | 856 | 279 | 420 | 9 | 11.80 | 0.82 | 1.26 |
| 36 | 316 | 3318 | 36 | 2200 | 569 | 531 | 782 | 9 | 10.50 | 1.68 | 2.47 |
| 37 | 352 | 2979 | 44 | 2658 | 1102 | 314 | 536 | 12 | 8.47 | 0.89 | 1.52 |
| 38 | 414 | 3604 | 33 | 2994 | 975 | 539 | 698 | 9 | 8.70 | 1.30 | 1.69 |
| 39 | 376 | 3402 | 38 | 2260 | 1120 | 352 | 557 | 8 | 9.05 | 0.94 | 1.48 |
| ME OH Extract (300 mg/kg) | | | | | | | | | | | |
| 41 | 370 | 2800 | 32 | 2400 | 538(+) | 458 | 663 | 10 | 7.57 | 1.24 | 1.73 |
| 42 (elim) | 308 | 636 | 37 | 2302 | 328(+) | 182 | 391 | 11 | 2.07 | 0.59 | 1.27 |
| 43 | 350 | 3576 | 34 | 2306 | 553(+) | 169 | 277 | 10 | 10.22 | 0.48 | 0.79 |
| 45 | 330 | 3145 | 28 | 2148 | 743 | 580 | 739 | 9 | 9.52 | 1.76 | 2.24 |
| 47 | 434 | 3443 | 54 | 3100 | 1018 | 342 | 468 | 10 | 7.93 | 0.79 | 1.08 |
| 48 | 388 | 2862 | 52 | 2887 | 720 | 461 | 524 | 11 | 7.37 | 1.19 | 1.35 |

TABLE VI

1) AVERAGE WEIGHT PER LOT: Beginning and end of experiment
2) AVERAGES OF THE TESTICLE AND PROSTATE INDICES:

| | Controls | CHCl$_3$Extr. 1 mg/kg | CHCl$_3$Extr. 10 mg/kg | Meth.Extr. 30 mg/kg | Meth.Extr. 300 mg/kg |
|---|---|---|---|---|---|
| Number of animals | 10 | 10 | 10 | 8 | 5 |
| Average weights beginning | 337 | 344.8 | 301.6 | 338. | 332/10 |
| Average weights end | 383.2 | 401.0 | 357.8 | 378.5 | 374.4/5 |
| Testicle indices | 8.384 ±0.418 | 8.025 ±0.531 | 8.645 ±0.827 | 9.770 ±0.774 | 8.522 ±1.579 |
| Overall prostate indices | 1.826 ±0.287 | 1.827 ±0.262 | 1.859 ±0.268 | 1.575 ±0.330 | 1.450 ±0.714 |
| Partial prostate indices | 1.335 ±0.270 | 1.379 ±0.271 | 1.354 ±0.330 | 1.080 ±0.269 | 1.092 ±0.603 |

TABLE VIII

AVERAGES PER LOT OF THE DIFFERENT ORGANS REMOVED

± the standard error Sm multiplied by tv (95%)

| | Controls ± Sm × 2.26 | CHCl$_3$Extr. 1 mg/kg ± Sm × 2.26 | CHCl$_3$Extr. 10 mg/kg ± Sm × 2.26 | Methan.Extr. 30 mg/kg ± Sm × 2.26 | Methan. Extr.300 mg/kg ± Sm × 2.26 |
|---|---|---|---|---|---|
| Number of animals | 10 | 10 | 10 | 8 | 5 |
| Testicles | 3.214g ±0.216 | 3.209 ±0.140 | 3.066 ±0.244 | 3.666 ±0.453 | 3.165 ±0.425 |
| Adrenals | 41.3 mg ±3.86 | 41.8 ±4.33 | 40.0 ±6.44 | 43.5 ±7.62 | 40.0 ±15.01 |
| Kidneys | 2.698 ±0.186 | 2.716 ±0.315 | 2.558 ±0.262 | 2.618 ±0.313 | 2.568 ±0.405 |
| Overall prostates | 0.698g ±0.106 | 0.733 ±0.120 | 0.647 ±0.105 | 0.585 ±0.096 | 0.534 ±0.222 |
| Partial prostates | 0.510g ±0.099 | 0.545 ±0.102 | 0.468 ±0.093 | 0.401 ±0.088 | 0.402 ±0.061 |
| Hypophyses | 9.77mg ±1.13 | 10.1 ±0.71 | 10.3 ±1.53 | 9.87 ±1.77 | 10.1 ±1.04 |

TABLE VIII — Continued

COMPARISON OF THE CONTROL LOT with:
1) Lot CHCl₃ extr. (10 mg/kg)
2) Lot Methanol extr. (30 mg/kg)
3) Lot Methanol extr. (300 mg/kg)
CALCULATOR OF "t" ACCORDING TO THE STUDENT FORMULA

|  | CH Cl$_3$ Extr. (10 mg/kg) | Methanol Extr. (30 mg/kg) | Methanol Extr. (300 mg/kg) |
|---|---|---|---|
| Degree of freedom t = | 18 | 16 | 13 |
| Tν (95%) | 2.10 | 2.12 | 2.16 |
| Ventral lobes t = | 0.57 | 2.41 | 1.81 |
| Complete prostate t =0.78 | 1.75 | 1.88 | |
| Overall prostate index t =0.18 | 1.76 | 1.86 | |
| Partial prostate index | t =0.10 | 1.51 | 107 |
| Testicles t = | 0.96 | 0.96 | 0.28 |

TEST C

ASSAYS ON DOGS 7 dogs of at least 9 years of age were used for the study. The background of all the dogs was rather uncertain as they were not of the usual laboratory-bred stock since these animals are rarely more than 18 months old. The "breeds" of animals used were as follows:

Four Alsatians
Two Labradors
One Jack Russell Terrier

Before commencing the dosing a biopsy of the prostate was taken under sedation and anesthesia. The dog received a daily dose of 10 mg/kg orally. On day 26 of the study a second prostatic biopsy was taken. Animals were killed on day 46 and a final prostate section removed. In addition portions of kidney, pituitary, ureter, testes and bladder were removed and fixed for optical histopathological examination.

No adverse effects were noted from the daily treatment.
Optical Microscopical Examination The histopathological report is shown fully in Table 2. Due to the urgency with which this experiment was begun there was insufficient time to select dogs with inactive prostate glands, and only two dogs — 2 and 3, had prostates that were inactive. Dog 2 showed a steadily maintained increase in activity, from barely active to active with moderate dilatation. Dog 3 showed a marked improvement in 3 weeks. The prostates of all the other dogs were active at the beginning of the experiment so that any alterations in these are not relevant.

The two dogs with inactive prostate glands showed a marked improvement with treatment.

Other histological results showed nothing unexpected from dogs of this age and are given below.

Dog 1—Bladder, erectile tissue, kidney, ureter, pituitary - normal.
 Testes — Slight atrophic changes only. Active spermatogenesis. Epididymis normal. Tubules filled with sperms.

Dog 2—Pituitary, kidney, erectile tissue, ureter, — normal.
 Bladder — Thickening of the muscle wall.
 Testes and Epididymis — Normal with active spermatogenesis.

Dog 3—Kidney, urethra, erectile tissue, pituitary — normal.
 Bladder — Thickening of muscle wall.
 Testis — Atrophic. Slight cell division but only an occasional sperm seen. Epididymis patchy chronic inflammation. No sperms seen. No significant change from 3A.

Dog 4— Pituitary and ureter normal
 Kidney — Patchy chronic pyelonephritis, with a necrotic papilla.
 Testis 1 — Tubular atrophy. No spermatogenesis. There is a low grade tubular and clear cell tumour, probably a Sertoli tumour.
 Testis 2 — Moderate tubular atrophy. Slight spermatogenesis. Epididymis normal but contains no spermatozoa.

Dog 5— Pituitary, kidney and vas — normal.
 Bladder — Mild chronic cystitis and moderate muscle thickening.
 Testes — Moderate tubular atrophy with reduced spermatogenesis. Epididymis normal with only a few sperms in the tubules.

Dog 6— Bladder, normal
 Kidney — Chronic pyelonephritis with scarring
 Pituitary — Several adenomatous nodules of acidophil cells.
 Testis 1 — Atrophic tubules. No spermatogenesis. A typical seminoma and a small Sertoli tumour. Epididymis normal. No sperms.
 Testis 2 — Senile atrophy. No spermatogenesis.

Dog 7— Bladder, ureters, kidney, pituitary — normal.
 Testis 1 — Slight atrophic change but active spermatogenesis. Epididymis normal and contains spermatozoa.
 Testis 2 — Moderate atrophy only slight spermatogenesis. Epididymis shows patchy chronic inflammation and few spermatozoa.

Results of test C are summarised in tables IX and X.

TABLE IX

| Dog No. | Dog breed | Dog Weight (kg) | Dosage | Total dose (mg) | Number of capsules Per Day |
|---|---|---|---|---|---|
| 1 | Alsatian | 32 | 10 mg/kg | 320 | 13 |
| 2 | Alsatian | 27 | do. | 270 | 11 |
| 3 | Alsatian | 34 | do. | 340 | 14 |
| 4 | Alsatian | 27 | do. | 270 | 11 |
| 5 | Labrador | 23 | do. | 230 | 9 |
| 6 | Labrador | 25 | do. | 250 | 10 |
| 7 | Jack Russell Terrier | 9 | do. | 90 | 4 |

TABLE X

| Dog No. | 1st Biopsy | 3Wk Biopsy | Terminal Biopsy |
|---|---|---|---|
| 1 | Active glands. | Active glands. No change. | Sheet of fibromuscular tissue with interstitial hemorrhage and granulation tissue. Periprostatic tissue. No definite prostate. |
| 2 | A few dilated glands and tubules with slight activity. | Scanty material but some active glands. | Active prostatic glands with moderate dilation. |
| 3 | Glands inactive. | Moderate gland activity. Marked change from 1st biopsy. | Atrophic inactive glandular epithelium. Moderate cystic dilation of some glands, comparable with senile nodular hyperplasia of human prostate. |
| 4 | Glands slightly active. | Glands more active. | Fat with haemorrhage and chronic inflammation, glands active. |
| 5 | Glands slightly active. | Glands more active. | Fibro fatty tissue. Glands active. |
| 6 | Glands slightly active. | Glands active, with some dilation. | Glands lined by active epithelium with some cystic change and patchy chronic inflammation. |
| 7 | Glands active. Slight dilation. | Glands active. Less dilation. | Active gland epithelium with some cystic dilation. |

For preparing pharmaceutical compositions from the physiologically active compounds of this invention, pharmaceutically acceptable carriers can be either solid or liquid. Solid form preparations include powders, tablets, dispersible granules, capsules, cachets and suppositories. A solid carrier can be one or more substances which may also act as diluents, flavoring agents, solubilizers, lubricants, suspending agents, binders or tablet-disintegrating agents; it can also be an encapsulating material. In powders the carrier is a finely divided solid which is in admixture with the finely divided compound. In the tablet the compound is mixed with a carrier having the necessary binding properties in suitable proportions and compacted in the shape and size desired. The powders and tablets preferably contain from 10 to 90% by weight of the active ingredient. Suitable solid carriers are magnesium carbonate, magnesium stearate, talc, sugar, lactose, pectin, dextrin, starch, gelatin, adroganth, methyl cellulose, sodium carboxymethyl cellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include solutions, suspensions and emulsions. As an example may be mentioned water-propylene glycol solutions for parenteral injection. Liquid preparations can also be formulated in solution in aqueous polyethylene glycol solutions, or in oil. Aqueous suspensions suitable for oral use can be made by dispensing the finely divided compound in water with viscous material, natural or synthetic gums, resins, etc., for example, gum arabic, ion-exchange resins, methyl cellulose, sodium carboxymethyl cellulose and other well known suspending agents.

Preferably, the pharmaceutical preparation is in unit dosage form. In such form, the preparation is subdivided in unit doses containing appropriate quantities of the compound, the unit dosage form can be a packaged preparation, the package containing discrete quantities of preparation, for example, packeted powders of vials or ampules.

The unit dosage form can be a capsule, cachet or tablet itself or it can be the appropriate number of any of those in packaged form. The quantity of compound in a unit dose of preparation may be varied or adjusted from 10 to 50 mg of *Prunus aficana* extract according to the particular application and the potency of the active ingredient.

In therapeutic use, the preparations are administered at the initial dosage of about 30 to 200 mg of *Prunus africana extract* daily, for 30 to 90 days. The dosages, however, may be varied depending upon the requirements of the patient.

Clinical assays have been carried out by experts. The average posology has been of three capsules daily. Generally one capsule at each meal-time, and sometimes four capsules daily. In the first case the average duration of treatment has been of 50 days and the others 30 days. Certain treatments have even been prolonged for 90 days in order to obtain probative results.

Each capsule contained:

| | |
|---|---|
| bark extract of Prunus aficana | 25 mg |
| peanut oil | 75 mg |
| gelatine ) | |
| glycerine ) | |
| water ) | s.q. for a 155 |
| potassium sorbate ) | mg capsule. |
| titanium dioxide ) | |
| solanthrene blue ) | |
| tartrazine ) | |

On account of the absence of toxicity from digestive, hepatic, and heamatological points of view the treatment may be prolonged for even longer periods of time if necessary.

The clinical assays have involved more than 500 cases. The efficiency of the extract has been provided (i.) by biopsy, and (i.i.) in case of failure only, by histological study after removal of the deficient part of the prostate.

The results in 250 cases are reported in table XI in accordance with the observations of the clinicians.

TABLE XI

| | Nb of cases | nb of failures |
|---|---|---|
| Prostatic adenomas | 94 | 23 (24.5%) |
| Functional disorders (of adenoma origin principally) | 135 | 14 (11.3%) |
| Prostatitis | 10 | 4 (40%) |
| Cervical dysectasies | 7 | 1 (14.3%) |
| Vesical neck diseases | 3 | 3 |
| Prostatectomy sequelae | 1 | 0 |
| Sum | 250 | 45 (18%) |

The results obtained are especially interesting in Prostate Adenoma before the stage of acute complication of retention which must be treated surgically (adenoma with post-micturitional residue inferior to 100 g). On the functional side, the results are constantly very satisfactory:

Pollakiuria decreases as well as nocturnal micturitia.

The urgent character of diurnal micturitians disappears as well as vesical intolerance.

The volumetric importance of the urine increased and the quality of the emission and its length are definitely improved.

The results of the histological studies have shown, after removal of the prostate from the rat or biopsies of dog and human prostate, a regeneration of the cells, particularly of the epithelial cells. The degeneration of the prostate is an irreversible phenomenon, and therefore any selerosis risks become definitive. The pharmacological and clinical tests and especially the results of the histological studies have enabled a mechanism of action to be envisaged, according to which the extract of *Prunus africana* acts at the level of the prostatic cell which it regenerates. It activates the cellular mechanisms, epithelium which ceased to be secreting, recovering its activity as shown by the morphological modification of cells, which from a cylindro-cubic aspect, where the whole cell is gathered around its nucleus, are transformed into an extended cylindric aspect jutting out in the "light" of the gland, which is a sign of the tissue activity. This fact has been confirmed not only in animals but also in humans when even after treatment the removal of the prostate adenoma was necessary. If the subject is cared for before the moment when the cellular modifications have reached an irreversible stage, the treatment has every chance of succeeding. In this case, for example, the hypertrophy of the prostate, which is an obstacle to micturation, may be cared for, and the volume of the prostate gland diminshes by the administration of extract of *Prunus africana*.

IDENTIFICATION OF THE DRIED AND CRUSHED PLANT

1. Microscopic Examination:

If the bark powder is too fine for the characteristic elements to be readily recognisable, the following test can be used:

A little of the bark powder is placed on the slide and covered with a cover slip after it has been moistened with a drop of water. A drop of concentrated sulphuric acid is placed on the edges of the cover slip. The diffusion of the acid causes crystallisation into fine radiating neędles (sea-urchin form).

2. Distillation:

A little of the bark powder is placed in the bottom of a test tube with one or two drops of water and a pastille of soda. The tube is heated. Red vapors are formed which deposit on the cold wall of the test tube as a claret red ring.

3. A pinch of the bark powder is washed with about 2 cc. of hot chloroform. The chloroform is filtered, several drops of acetic anhydride are added to the filtrate, and 1 cc. of concentrated sulphuric acid are poured gently down the wall of the test tube containing the filtrate. At the level of the surface of separation between the two phases, a rose-colored ring is formed, while the chloroform phase is coloured pale green.

4. A pinch of the bark powder is washed cold with about 2 cc. of water, the solution is filtered and then diluted until it is only slightly colored. A little concentrated sulphuric acid is introduced, by means of a pipette, into the bottom of the test tube containing the diluted solution. A dark violet ring appears at the surface of separation between the phases. If the volume of acid is at least equal to the volume of water, the mixtures of the two phases keeps the violet color. Reaction is very noticeable.

5. A little of the bark powder is washed with water as in the previous test and the solution is filtered. An equal volume of water saturated with bromine is added to the filtered solution. A light flaky precipitate is formed.

6. Two drops of an aqueous solution prepared from the bark powder as in the two preceding tests are added to 5 cc. of water. 1 cc. of concentrated hydrochloric acid is added to the solution. The acidified solution is heated and a vermillion coloration appears. Cooling causes a precipitate to form. Reaction is very noticeable.

7. To an aqueous solution prepared from the bark powder as in tests (4) and (5), five to 10 drops of a 1% aqueous solution of iron perchloride are added. The green coloration of pyrocatechol tannins appears.

8. Chromatography:

a. Using a total methanol extract of the bark powder, and n-butanol/2N HCl (98:2) mixture as the solvent, and a thin layer of silica as the chromatographic support, a series of spots are obtained, of which the most distinct have Rf values of 0.1, 0.4, 0.7 and 0.8 respectively.

Using the same extract and solvent, but paper as the chromatographic support, a reasonably distinct spot having an Rf value of 0.36 is observed.

b. Using a total chloroform extract of the bark powder, a methylene chloride/benzene (1:1) mixture as the solvent, and paper as the chromatographic support, two spots having RF values of 0.3 and 0.7 respectively are obtained. The spot of Rf 0.7 is cut out and eluted with chloroform. The eluate gives the colour reaction described in test (3) above.

Using the same extract and chromatographic support, but a mixture of methanol containing 1% glacial acetic acid and water (30:70) as the solvent, the constituent which in the previous chromatograph had an Rf of 0.3, this time has an Rf of 0.6; the other constituent does not migrate at all.

All these chromatographs are revealed in ultraviolet light or by development with iodine vapour or with concentrated sulphuric acid. Certain spots are naturally yellow or red.

9. Establishing the Presence of Saponins:

Methanolic extracts (using various concentrations of methanol) and aqueous extracts of the bark powder tend to foam. The presence of saponins is confirmed by the haemolysing power of these extracts: fresh rabbit blood is diluted to 50% with a solution of the extract in 0.9% aqueous sodium chloride. A control is prepared in exactly the same way but without the extract. The mixtures are allowed to stand for ¼ hour in an oven at 37° C. After centrifugation, the serum of the control tube separated as a light yellow clear supernatant layer; the supernatant layer of the tube containing the extract is red.

What is claimed is:

1. A process for preparing an extract of the bark of *Prunus africana* suitable for the treatment of prostatic adenoma, comprising contacting finely ground bark of *Prunus africana* with a solvent selected from the group consisting of methanol, an 80:20 mixture of methanol and water, chloroform, methylene chloride, benzene, cyclohexane, petroleum ether, diethyl ether, acetone, methylethylketone and mixtures thereof, said solvent being present in a proportion represented by 1 Kg of finely ground bark to at least 2 litres of solvent; separating the resulting solution of bark solubles from the finely ground bark and evaporating the solvent to yield said solubles.

2. A process as claimed in claim 1 wherein the bark solubles are chromatographed on a silica column to separate a fraction rich in sterols; the sterol-rich fraction is eluted with an eluting solvent selected from the group consisting of cyclohexane, methylene chloride, benzene and mixtures thereof and the sterol-rich fraction is obtained from the resulting solution in crystalline form.

3. The product prepared by the process of claim 1.

4. A therapeutic composition in powder or tablet form for the treatment of prostatic ademona, comprising an extract prepared by the process of claim 1 in association with a pharmaceutically acceptable solid carrier, said composition containing from 10 to 90% by weight of active ingredient.

5. A therapeutic composition in powder or tablet form for the treatment of prostatic adenoma, comprising an extract prepared by the process of claim 2 in association with a pharmaceutically acceptable solid carrier, said composition containing from 10 to 90% by weight of active ingredient.

6. A therapeutic composition in dosage unit form for the treatment of prostatic adenoma by oral administration, comprising from 10 to 50 mg of the product produced by the process of claim 2.

7. A process for treating a subject suffering from prostatic adenoma, comprising orally administering daily to said subject an effective amount of the product produced by the product of claim 2.

8. The process of claim 7 in which there is administered daily from 30 mg to 200 mg of said product.

* * * * *